(No Model.)

G. F. SIMONDS.
Method of Correcting Unequal Tension in Circular Saws.

No. 237,915.  Patented Feb. 15, 1881.

Witnesses:
H. G. Olmsted
W. P. Preble Jr

Inventor:
George F. Simonds
by W. W. Swan
his atty.

UNITED STATES PATENT OFFICE.

GEORGE F. SIMONDS, OF FITCHBURG, MASSACHUSETTS.

METHOD OF CORRECTING UNEQUAL TENSION IN CIRCULAR SAWS.

SPECIFICATION forming part of Letters Patent No. 237,915, dated February 15, 1881.

Application filed November 22, 1880. (No model.)

*To all whom it may concern:*

Be it known that I, GEORGE F. SIMONDS, of Fitchburg, Massachusetts, have invented a new and useful Improvement in the Method and Apparatus for Correcting Unequal Tension in Circular Saws as regards the condition of the metal, of which the following is a clear, full, and exact description, reference being had to the accompanying drawings, making a part of this specification, in which—

Figure 1:
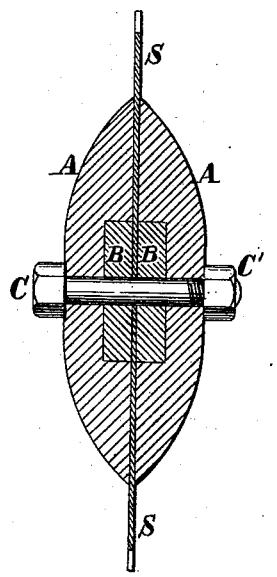
Figure 2:
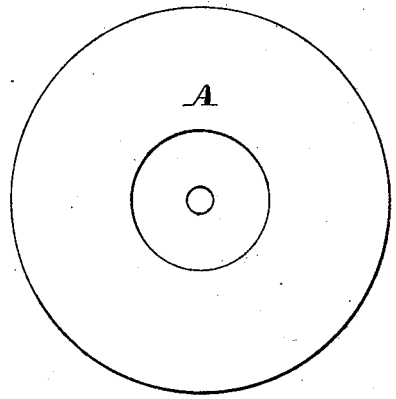
Figure 3:
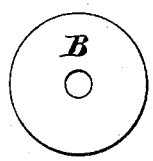
Figure 4:
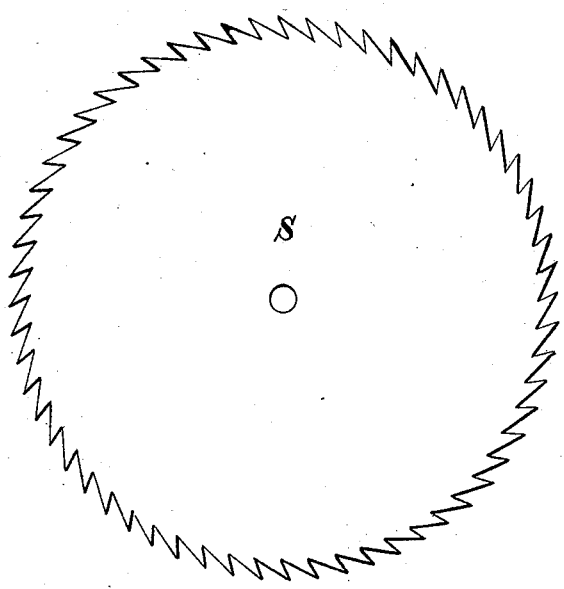

Figure 1 represents a vertical section my improved apparatus. Fig. 2 is a side elevation of one of the formers, showing its operating-face. Fig. 3 is an elevation of the disks. Fig. 4 shows a saw.

My invention refers to a method of correcting unequal tension in circular saws during their manufacture; and it consists, first, in the method, and, secondly, in the combination of devices by which the method is carried out.

To enable others skilled in the art to practice my process and to make and use my apparatus, I will proceed to describe the exact manner in which I have carried it out.

Suppose a saw sixty inches in diameter to be loose in the center, or, in other words, too large. The old way of equalizing its tension would be to expand the whole saw in all its parts, except the center, by continuous hammering. This is a slow and costly process; and I overcome the difficulty by acting upon the loose center of the saw.

In the drawings, A A are formers, recessed in the center to receive the metal disks B sitting flush with the faces of the formers. Only one of the formers may be recessed, but I prefer to recess both and use two disks. Through the center of the formers and disks are openings to receive the clamp-bolt C, which is secured when in position by the nut C'.

The operation is as follows: When I find the center of the saw too loose, instead of hammering up the rest of the saw to correspond with the center, I heat up the disks B, and, placing them in the recesses of the formers, I clamp the saw firmly between the formers, the center or loose part of the saw falling between the heated disks. The steel of the center of the saw becomes heated, and not being able to expand, as the outer zone of the saw is held firmly clasped between the formers, the steel is upset within itself, and thus tightened to correspond with the rest of the saw. By this process of correcting unequal tension in the metal of circular saws I save great labor and cost, and the correction is easily and quickly accomplished.

It is evident that my method may be applied to all kinds of saws without departing from the spirit of my invention.

Having thus described my invention, what I claim as new, and desire to secure by Letters Patent, is—

1. The method herein described of correcting unequal tension in saws by clamping them between heated disks held in formers of ordinary temperature, the formers also clamping the saw around the outside of the disks, substantially as herein described.

2. The formers A A, recessed to receive the disks B, in combination with the disks B and a clamping device, substantially as and for the purpose set forth.

GEORGE F. SIMONDS.

Witnesses:
HARRIS HARTWELL,
DANIEL SIMONDS.